United States Patent
Sendyk et al.

Patent Number: 5,268,930
Date of Patent: Dec. 7, 1993

[54] DECISION FEEDBACK EQUALIZER

[75] Inventors: Andrew M. Sendyk; Yongbing Wan, both of Calgary, Canada

[73] Assignee: NovAtel Communications Ltd., Calgary, Canada

[21] Appl. No.: 810,693

[22] Filed: Dec. 19, 1991

[51] Int. Cl.⁵ .............................................. H03H 7/40
[52] U.S. Cl. ...................................... 375/13; 375/14; 333/18
[58] Field of Search ............... 375/13, 14, 16; 333/18; 364/724.2

[56] References Cited

U.S. PATENT DOCUMENTS

| | | | |
|---|---|---|---|
| 3,571,733 | 3/1971 | Fang | 328/162 |
| 3,868,603 | 2/1975 | Guidoux | 333/18 |
| 3,974,449 | 8/1976 | Falconer | 325/321 |
| 4,004,226 | 1/1977 | Qureshi et al. | 325/42 |
| 4,227,152 | 10/1980 | Godard et al. | 375/13 |
| 4,271,525 | 6/1981 | Watanabe | 375/14 |
| 4,309,770 | 1/1982 | Godard | 375/14 |
| 4,375,692 | 3/1983 | Shensa et al. | 375/13 |
| 4,520,489 | 5/1985 | Hogge, Jr. | 375/14 |
| 4,545,060 | 10/1985 | Arnon | 375/14 |
| 4,583,234 | 4/1986 | Ramadan | 375/11 |
| 4,709,374 | 11/1987 | Farrow | 375/13 |
| 4,727,429 | 2/1988 | Ueno | 358/476 |
| 4,730,343 | 3/1988 | Kanemasa et al. | 375/14 |
| 4,789,994 | 12/1988 | Randall et al. | 375/12 |
| 4,811,360 | 3/1989 | Potter | 375/13 |
| 4,833,693 | 5/1989 | Eyuboglu | 375/34 |
| 4,866,736 | 9/1989 | Bergmans | 375/18 |
| 4,870,657 | 9/1989 | Bergmans et al. | 375/14 |
| 4,878,232 | 10/1989 | Fisher | 375/111 |
| 4,899,366 | 2/1990 | Davis et al. | 375/14 |
| 5,097,482 | 3/1992 | Serizawa et al. | 375/14 |
| 5,155,742 | 10/1992 | Ariyavisitakul et al. | 375/13 |

OTHER PUBLICATIONS

"Double Decision Feedback Equalizer", Kawas-Kaleh, G., *Frequenz*, 33, (1979), 5, pp. 146–148.

"Equalization of QPSK Data Transmission in Specular Multipath", Ziemer, R. E. and C. R. Ryan, *IEEE Transactions on Aerospace and Electronic Systems*, vol. AES-10, No. 5, Sep. 1974, pp. 588–594.

"Baseband Equalizer Performance in the Presence of Selective Fading", Sari, H., *IEEE Global Telecom*, 1983, pp. 1.1.1–1.1.7.

"Bi-directional Equalization Technique for TDMA Communication Systems over Land Mobile Radio Channels", Yow-Jong Liu, presented Dec. 4, 1991 at GLOBECOM '91.

"A DQPSK Digital Mobile Receiver with Self-Recoverable Decision Feedback Equalizer and Delay Spread Measurement Device", Yongbing Wan and Andrew Sendyk, presented on Jul. 10, 1991 at Wireless 91, Calgary, Alberta, Canada.

*Primary Examiner*—Curtis Kuntz
*Assistant Examiner*—T. Ghebretinsae
*Attorney, Agent, or Firm*—Cesari and McKenna

[57] ABSTRACT

An improved decision feedback equalizer for use with digital communications. The equalizer includes an error detector, a process controller, a parameter selector and a data buffer for temporarily storing a digital data signal received from a communication channel. The error detector determines whether the equalizer is accurately tracking changes in the communication channel's characteristics or is lost. When the error detector determines that the equalizer is lost, the process controller responsively generates control signals for initiating an optimal retraining/recovery method for the prevailing conditions. In some retraining/recovery methods, data is temporarily stored in the buffer. The stored data is later retrieved and processed once the equalizer is retrained. Retraining is performed using a retraining signal received via the communication channel or, if available, a portion of the data signal which is suitable for retraining, thereby permitting more rapid resumption of data reception. In addition, the parameter selector, in response to a control signal from the process controller and a signal which is indicative of the rate of change of the communication channel's characteristics, dynamically adjusts the convergence rate of the equalizer to provide to an optimum value for performing retraining or tracking changes in the channel's characteristics.

30 Claims, 8 Drawing Sheets

DECISION FEEDBACK EQUALIZER

BACKGROUND OF THE INVENTION

1. Field of the Invention

The present invention relates generally to the field of equalizers for use in digital communications and, more particularly, to an improved decision feedback equalizer for use in time division multiple access communications.

2. Discussion of the Prior Art

An ideal communication link is characterized by a transfer function having a flat amplitude response and linear phase response as a function of frequency. In practice, however, deviations from the ideal occur and cause distortion and interference with a signal transmitted via the link. The causes of such deviations include communication devices (e.g., filters) and communication channels whose characteristics vary over time or space or both.

Consider the example of a cellular telephone system where a transceiver is used to place or receive a call from an arbitrary location within a service area or while moving through the area. The radio communication channel between the transceiver and the base station that processes the call is subject to the multipath phenomenon caused by buildings, terrain features and the like. In general, the multipath phenomenon causes the transfer function of the radio communication channel to become frequency dependent. In addition, if the transceiver is moving, the amplitude of the received signal may vary with time over a wide dynamic range, a phenomenon known as "fading."

To compensate for deviations in the transfer function, a device known as an equalizer may be used. The equalizer receives a transmitted signal and compensates, as ideally as possible, for distortion or interference caused by variations in the transfer function of the communication link. Stated another way, the function of an equalizer is to estimate what distortion or interference is present in a received signal and modify that signal to obtain a "true" representation of the signal that was actually transmitted.

Various types of equalizers are known in the prior art. One type, known as adaptive equalizers, are used in applications where the transfer function of a communication link varies with time, as in the example described above. An adaptive equalizer operates in accordance with a specified error-minimizing algorithm to dynamically modify a received signal to minimize the error between the received signal and a reference or assumed "true" signal. Two well known algorithms are recursive least square (RLS) and least mean square (LMS).

In order to initialize themselves to properly modify a received signal, adaptive equalizers follow a "training" procedure. Training is accomplished by transmitting to the equalizer a training signal (e.g., a particular sequence of symbols) which is known by the equalizer in advance. As the training signal is received, the equalizer is required to converge and adjust its signal-modification circuitry such that a minimum error is obtained in accordance with the operative error-minimizing algorithm. Through the training process, the equalizer effectively configures itself to substantially compensate for distortion or interference introduced by a given communication link under prevailing environmental conditions.

However, under dynamic conditions (e.g., a communication channel having a time-varying transfer function), the equalizer may lose track of the received signal and begin to make improper modification of that signal resulting in erroneous operation. In this error condition, the equalizer is sometimes said to be "lost." A conventional technique for recovering from a lost condition is to simply retrain the equalizer. That is, a training (retraining) signal is transmitted to the equalizer, which is again forced to converge and readjust its signal-modification circuitry.

There are several problems with conventional adaptive equalizers which render their performance inadequate for many applications. First, in time division multiple access (TDMA) communications, information is transmitted in pre-assigned time slots or frames by multiple transmitters over a shared communication channel. If a particular equalizer becomes lost in the middle of a frame, the equalizer may not be able to retrain until the end of that frame, which generally results in the loss of any subsequent data in that frame and a requirement of retransmission in a later frame. Obviously, as the number of required retransmissions increases, there is a corresponding decrease in the number of frames available for transmission of other data.

Second, since a conventional equalizer operates with a fixed convergence rate, that rate must represent a trade-off between the need to converge (complete training) within a given maximum time and the desire to train the equalizer as accurately as possible by allowing a longer training period. Also, during channel tracking, the equalizer may be incapable of adapting fast enough to properly track changes in the received signal if the transfer function of the communication channel changes too rapidly or over a larger than expected dynamic range.

SUMMARY OF THE INVENTION

In brief summary, the present invention provides an improved decision feedback equalizer for digital communications, including TDMA communications. The performance of the equalizer may be dynamically adjusted in response to the rate of change of a communication channel's characteristics and the availability of training or retraining signals. If the equalizer becomes lost, one of multiple retraining/recovery methods is selected depending upon the availability of a signal suitable for retraining and the rate of change of the communication channel's characteristics.

The present invention includes an error detector, a process controller, a parameter selector and a data buffer for temporarily storing a digital data signal received from a communication channel. The error detector produces an error decision signal indicative of whether the equalizer is accurately tracking changes in the communication channel's characteristics or is lost. When the error detector determines that the equalizer is lost, the process controller responsively generates control signals for initiating an optimal retraining/recovery method for the prevailing conditions.

In some retraining/recovery methods provided by this invention, the data signal received by the equalizer is temporarily stored in a buffer (memory). The stored data is subsequently retrieved and processed once the equalizer is retrained. Thus, such data need not be retransmitted via the communication channel. Retraining is performed using a retraining signal received via the communication channel or, if available, a portion of the data signal which is suitable for retraining, thereby permitting more rapid recovery and resumption of data reception.

In addition, the parameter selector, in response to a control signal from the process controller and a signal which is indicative of the rate of change of the communication channel's characteristics, dynamically adjusts the convergence rate of the equalizer to provide to an optimum value for performing retraining or tracking the channel. Thus, the convergence rate may be adjusted to an optimum value for performing retraining and subsequently readjusted for tracking (data reception).

As a result of the retraining/recovery methods and ability to dynamically adjust its convergence rate to optimize performance under prevailing conditions, the improved decision feedback equalizer exhibits a substantial decrease in the bit error rate as a percentage of bits transmitted.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF ILLUSTRATIVE EMBODIMENTS

Figure 1:
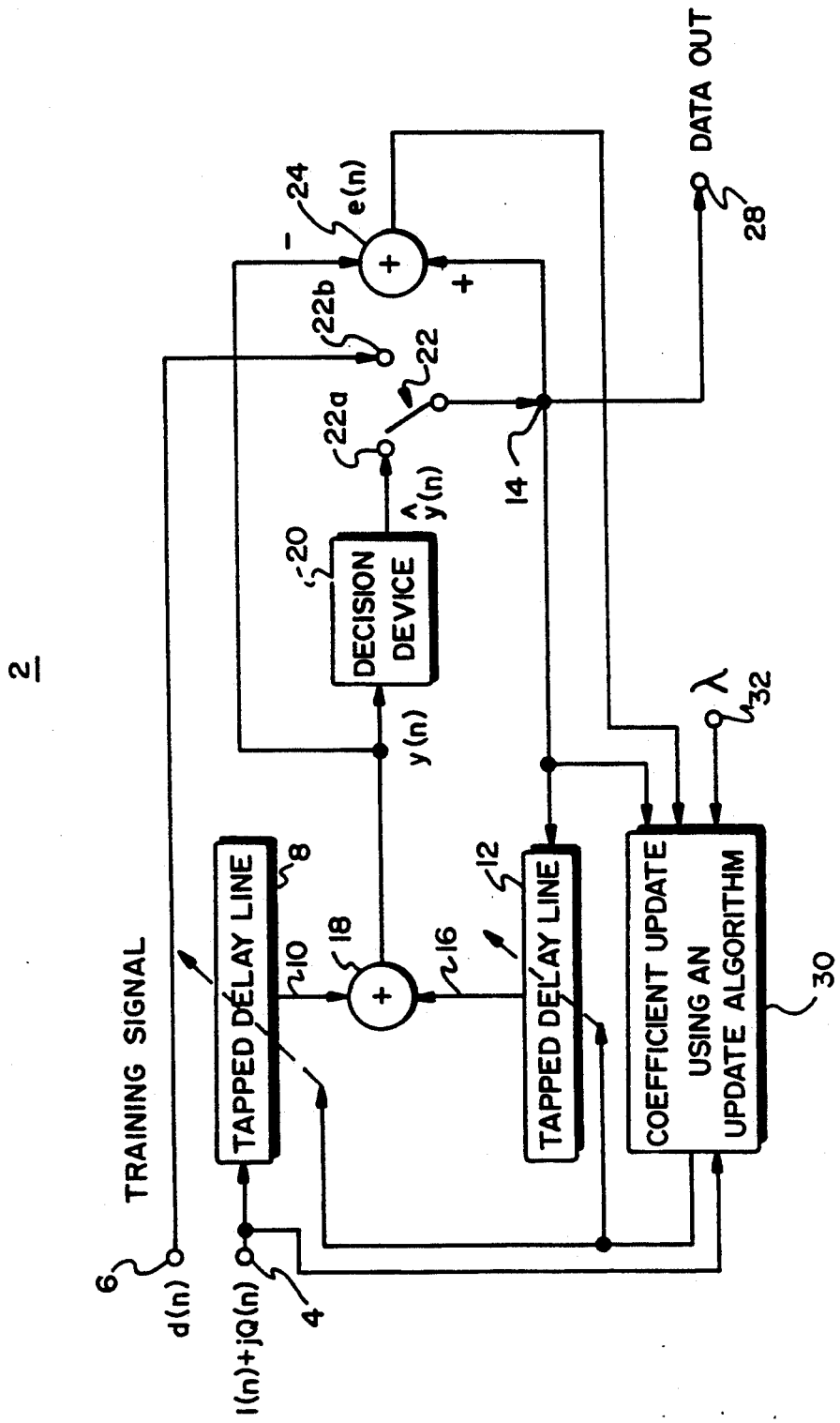
FIG. 1 is a block diagram of a conventional decision feedback equalizer known in the prior art.

FIG. 1 shows an adaptive decision feedback equalizer 2 known in the prior art. At an input node 4, the equalizer receives a digital data signal $I(n)+jQ(n)$ (where $I(n)$ is the real and $jQ(n)$ is the imaginary part) transmitted via a communication channel (not shown) such as a radio frequency channel. At an input node 6, the equalizer receives a training signal $d(n)$, which is passed to a node 22b of a switch 22.

A tapped delay line 8 receives the data signal present at input node 4. Tapped delay line 8 may represent, for example, an n-stage device where n is a multiple of the period of a transmitted symbol or of a fraction of the symbol period. The output of each stage of the tapped delay line is passed through weighting circuitry having an adjustable coefficient that represents a preselected gain (attenuation). The outputs of the weighting circuitry for all stages are then summed and the result presented as an output signal 16.

A second tapped delay line 12, whose period of delay and whose coefficients are usually different from those of delay line 8, receives a signal present at a node 14. In a manner similar to that of delay line 8, delay line 12 produces an output signal 16. An adder 18 adds the output signals 10 and 16 to produce a compensated data signal $\hat{y}(n)$.

A decision device 20 receives the compensated data signal $\hat{y}(n)$. The decision device 20 produces a decision result signal $y(n)$, which is ideally a perfect representation of the digital data signal $I(n)+jQ(n)$ compensated for distortion and interference. The decision result signal $\hat{y}(n)$ appears at node 22a of the switch 22.

Depending upon the position of the switch 22, either the decision result signal $\hat{y}(n)$ or the training signal $d(n)$ is passed to node 14. That is, when the equalizer 2 is trained or retrained, the switch 22 is positioned to pass the training signal $d(n)$ to node 14. Alternately, when the equalizer 2 is receiving the data signal, the switch 22 passes the decision result signal $\hat{y}(n)$ to node 14.

An adder 24 produces an error signal $e(n)$ which is the difference between the compensated data signal $\hat{y}(n)$ and the signal then present $\hat{y}(n)$ or $d(n)$) at node 14. Thus, the error signal $e(n)$ serves as an indication of how perfectly the tapped delay lines 8 and 12 have compensated the data signal (or training signal) received at node 4 for any distortion or interference. The smaller the error signal $e(n)$, the more perfect the compensation.

The error signal $e(n)$ is passed to a coefficient update device 30, which is also connected to receive the digital signal present at node 4 and the signal present at node 14. The coefficient update device 30 functions, in accordance with a preselected error-minimizing algorithm such as recursive least square (RLS) or least mean square (LMS), to dynamically adjust the coefficients of the tapped delay lines 8 and 12 so as to minimize the error signal $e(n)$. A value $\lambda$, which controls the rate of convergence and the minimum mean square error, is applied at node 32 to the coefficient update device 30. The value $\lambda$ is called the "forgetting factor" in the RLS algorithm or the "step size" in the LMS algorithm.

Figure 2:
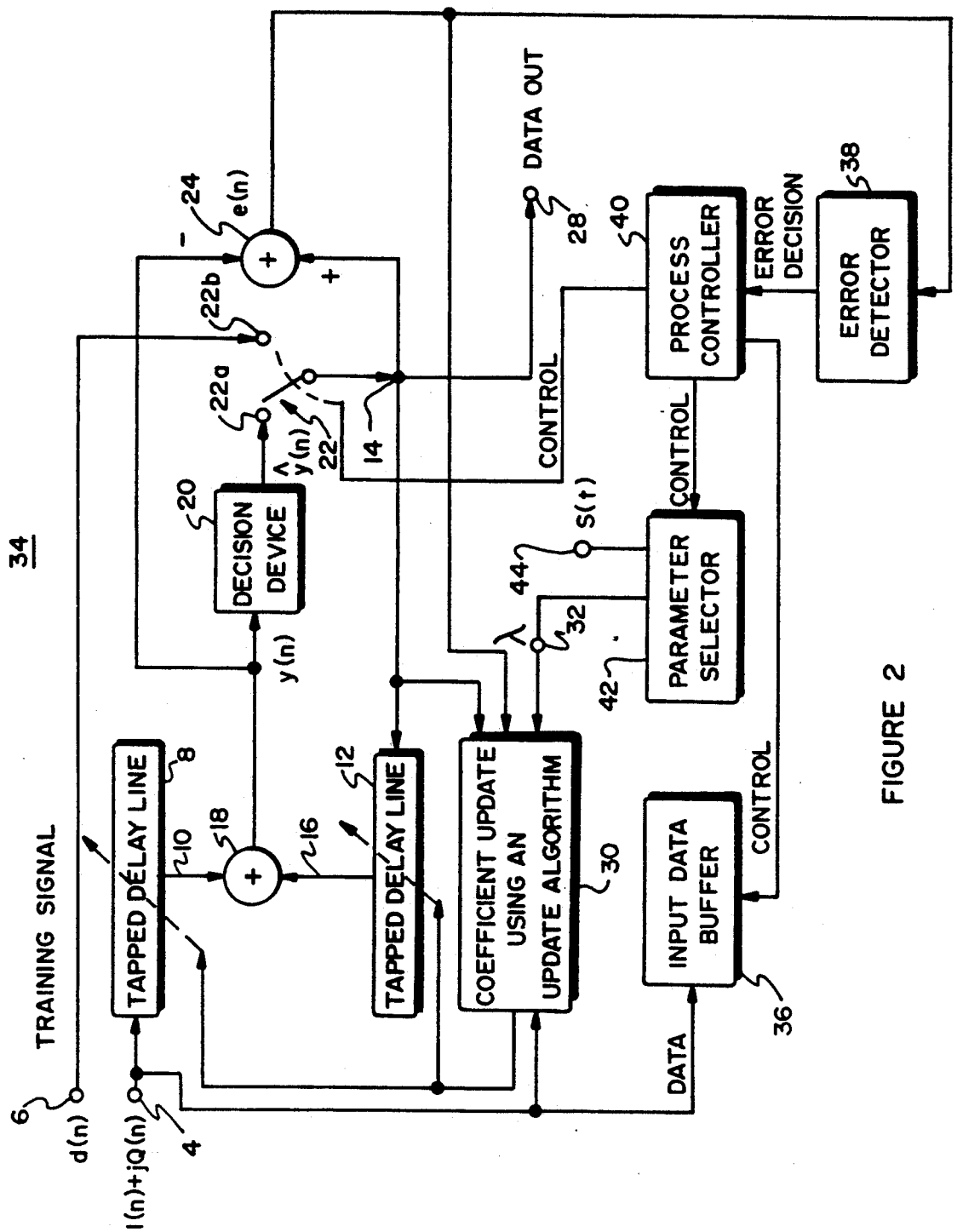
FIG. 2 is a block diagram of an improved decision feedback equalizer constructed in accordance with a preferred embodiment of the present invention.

FIG. 2 depicts an improved decision feedback equalizer 34 constructed in accordance with a preferred embodiment of the present invention. For consistence and clarity, like components previously identified are designated by the same reference numerals.

A data buffer 36 is connected to node 4 for alternately storing the digital data signal $I(n)+jQ(n)$ or retrieving a stored data signal and passing it to the tapped delay line 8. An error detector 38 is connected to receive the error signal $e(n)$ from the adder 24. The error detector 38 produces an error decision signal which is supplied to a process controller 40. The process controller 40 produces control signals which are applied, respectively, to the data buffer 36, the switch 22 and a parameter selector 42. The parameter selector 42 receives at node 44 a signal $S(t)$, which is indicative of the rate of change of the communication channel's characteristics. In response to the signal $S(t)$ and the control signal from the process controller 40, the parameter selector 40 dynamically produces the value $\lambda$ at node 32.

Figure 3:
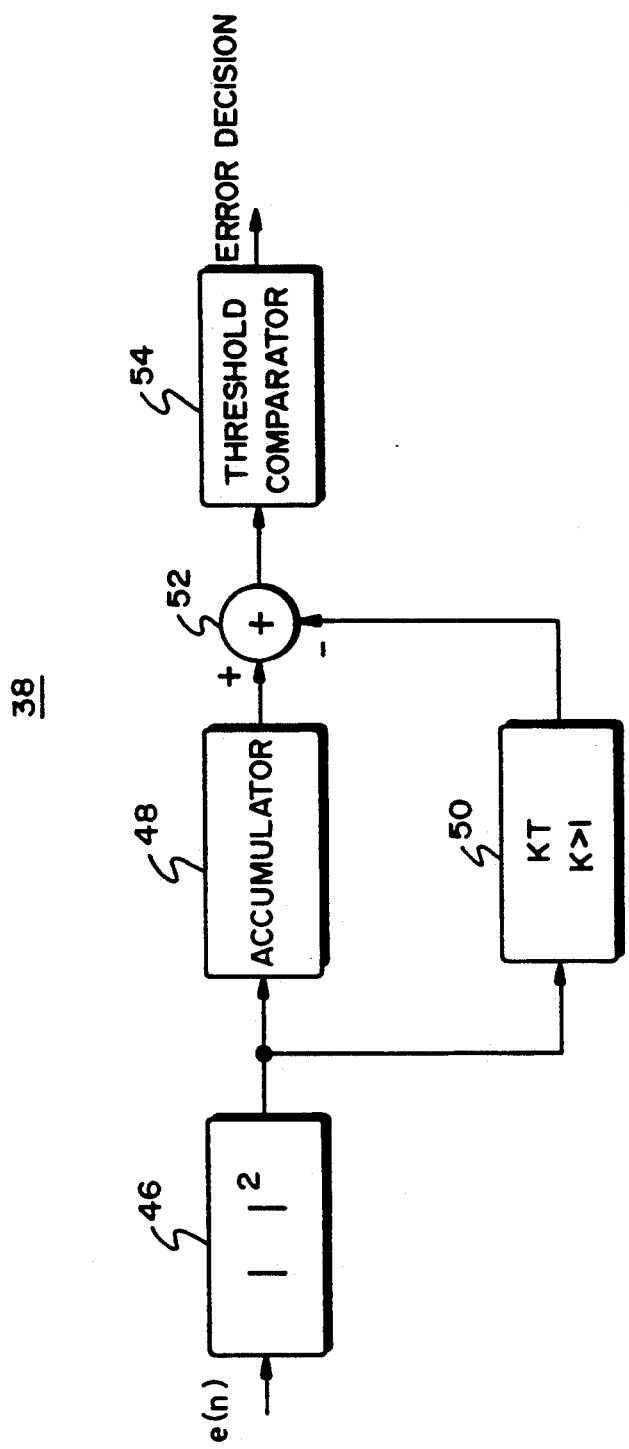
FIG. 3 is a block diagram of the error detector shown in FIG. 2.

FIG. 3 is a diagram of the error detector 38 shown in FIG. 2. Error signal e(n) is applied to squaring device 46 whose output signal is the square of the magnitude of the error signal. An accumulator 48 accumulates the output signal of device 46 and produces an output signal which is applied to an adder 52. Time delay device 50 receives the output signal of block 46 and, following a delay of K symbol period where K>1, passes that signal to adder 52 where it is subtracted from the output signal of the accumulator 48. As a result, the output signal of adder 52 represents the accumulation of the last K error signals where K>1.

The output signal of adder 52 is applied to a threshold comparator 54 which compares that signal to a reference in order to decide whether the equalizer 34 is no longer accurately tracking changes in the communication channel's characteristics (i.e., the equalizer is lost).

Figure 4:
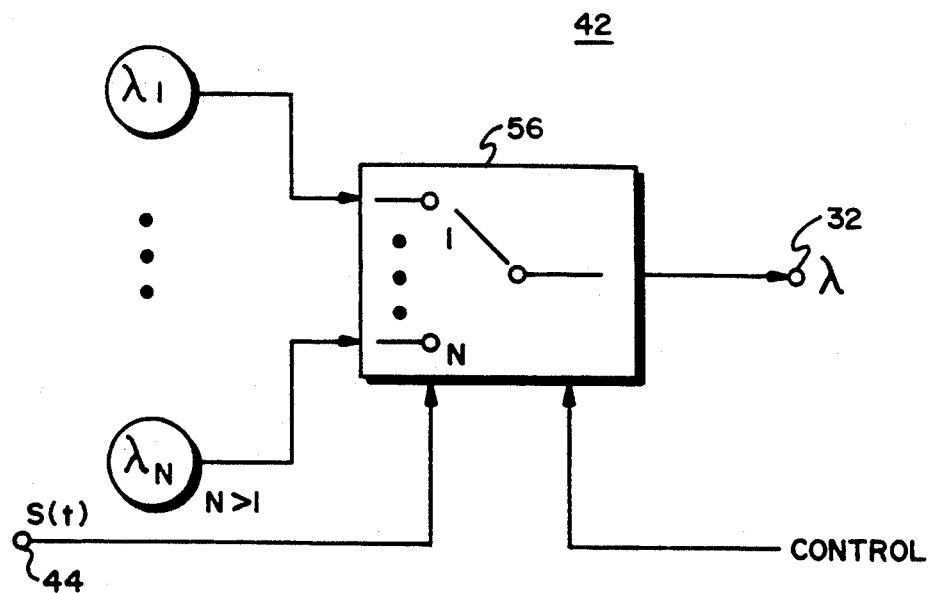
FIG. 4 is a block diagram of the parameter selector shown in FIG. 2.

FIG. 4 is a diagram of the parameter selector 42 shown in FIG. 2. An array of values $\lambda_1$ to $\lambda_N$ (where N>1) is coupled to a selector 56. The selector 56 operates, in response to the signal S(t) and a control signal from the process controller 40, to dynamically select a particular $\lambda$ value which appears at node 32. As discussed below, the parameter selector 42 may select different $\lambda$ values for various retraining/recovery methods or when the equalizer is receiving and processing data.

Figure 5A:
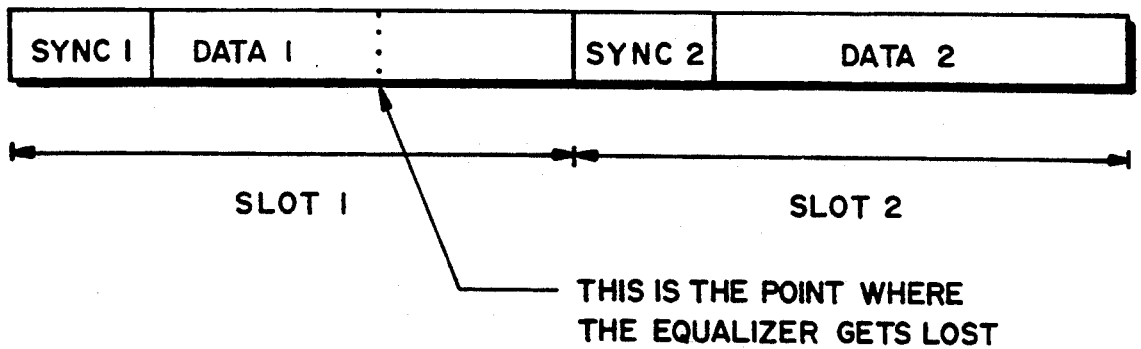
FIG. 5A depicts the occurrence of one type of equalizer error condition during a TDMA communication slot.

The detailed operation of the equalizer 34 will now be described with reference to FIGS. 2, 5A and 5B. FIG. 5A shows slots 1 and 2 which represent time slots in a TDMA communication system. The data transmitted within each slot is preceded by a synchronization signal (SYNC) in accordance with a conventional TDMA communication protocol. Assume that slots 1 and 2 represent a portion of the data signal I(n)+jQ(n) received at node 4. Assume further that equalizer 34 is disposed in a mobile vehicle.

Figure 5B:
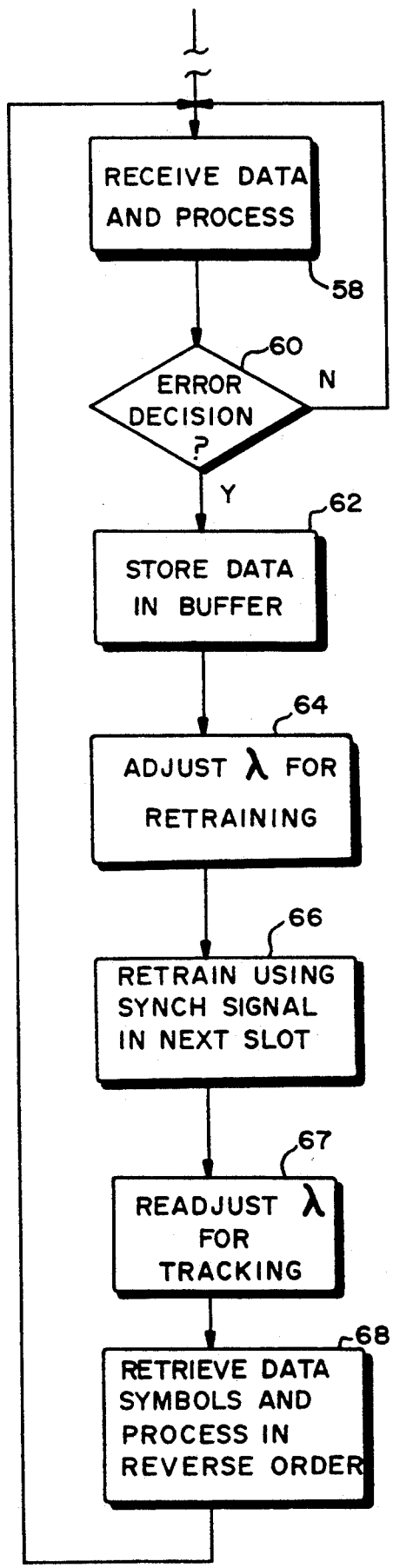
FIG. 5B is a flowchart diagram of a method of recovering from the error condition shown in FIG. 5A in accordance with a preferred embodiment of the present invention.

The equalizer 34 is receiving and processing the data transmitted in slot 1, as indicated at step 58 in FIG. 5B. At the point in time denoted by the dashed line in slot 1, the equalizer 34 experiences a deep fade caused by interference from a tall building. The error detector 18 detects an increase in the magnitude of the error signal e(n) and determines that an error condition exists (i.e., the equalizer 34 is lost), which is in turn reflected in the error decision signal (step 60) provided to the process controller 40.

The process controller 40 responds to the decision that an error condition exists by initiating a retraining-/recovery method. The process controller 40 issues a control signal to the data buffer 36 to store (write) the remainder of the data received during slot 1 through the end of the SYNC 2 signal of slot 2. Contemporaneously, the process controller 40 issues a control signal to the parameter selector 42 to adjust $\lambda$ (step 64) to a value that is optimal for retraining the equalizer 34. The parameter selector 42, in response to the control signal from the process controller 40 and the signal S(t), selects an appropriate $\lambda$ value.

In a preferred embodiment, S(t) is a signal which is indicative of the speed of the vehicle in which the equalizer 34 is disposed. Such a signal is preferred for S(t) since it is known that there is a correlation between the rate of change of the characteristics of a radio channel used by a moving vehicle and the speed at which the vehicle is moving. Generally, the faster the vehicle moves, the faster the rate of change of the channel's characteristics.

At step 66, the equalizer 34 is ready to be retrained using the SYNC 2 signal as the retraining signal. Thus, once the SYNC 2 signal is stored in the buffer 36, the process controller 40 positions switch 22 such that the retraining signal is passed to node 14. Simultaneously, the process controller 40 issues a control signal to the buffer 36 to retrieve (read) the stored data and pass it to node 4 for processing. The retraining signal and the data are retrieved in the reverse order from which they were received. The equalizer 34 converges and the coefficients of the delay lines 8 and 12 are adjusted such that the error signal e(n) is minimized.

Having retrained the equalizer, the process controller 40 (at step 67) issues a control signal to the parameter selector 42 to readjust (optimize) the value of $\lambda$ in preparation for receiving and processing data. In a preferred embodiment, this readjustment depends upon the vehicle speed as represented by S(t) and the length (duration) of the data signals (slots) to be received. Thus, the faster the vehicle speed and the shorter the data signal, the faster the optimum convergence rate. The process controller 40 (at step 68) repositions switch 22 such that $\hat{y}(n)$ is passed to node 14. The process controller 40 then issues a control signal to the data buffer 36 to retrieve (read) a data symbol previously stored therein and pass it to node 4 for processing. As the decision device 20 produces the decision $\hat{y}(n)$ for each symbol, the coefficients of the delay lines 8 and 12 are adjusted so that e(n) is minimized. Additional symbols are iteratively retrieved from the buffer 36 and processed as just described until all of the symbols are retrieved or an error condition is reflected in e(n).

The ability to follow the received data signal backward, coupled with the ability to dynamically adjust the convergence rate of the equalizer in order to optimize retraining as well as the resumption of processing data, permits most of the data of slot 1 that follows the occurrence of an error condition to be recovered without the necessity of retransmission.

Figure 6A:
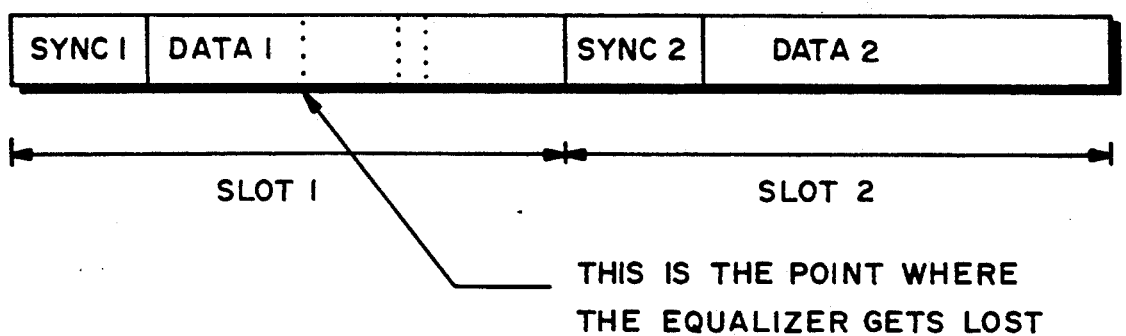
FIG. 6A depicts the occurrence of a second type of equalizer error condition during a TDMA communication slot.
Figure 6B:
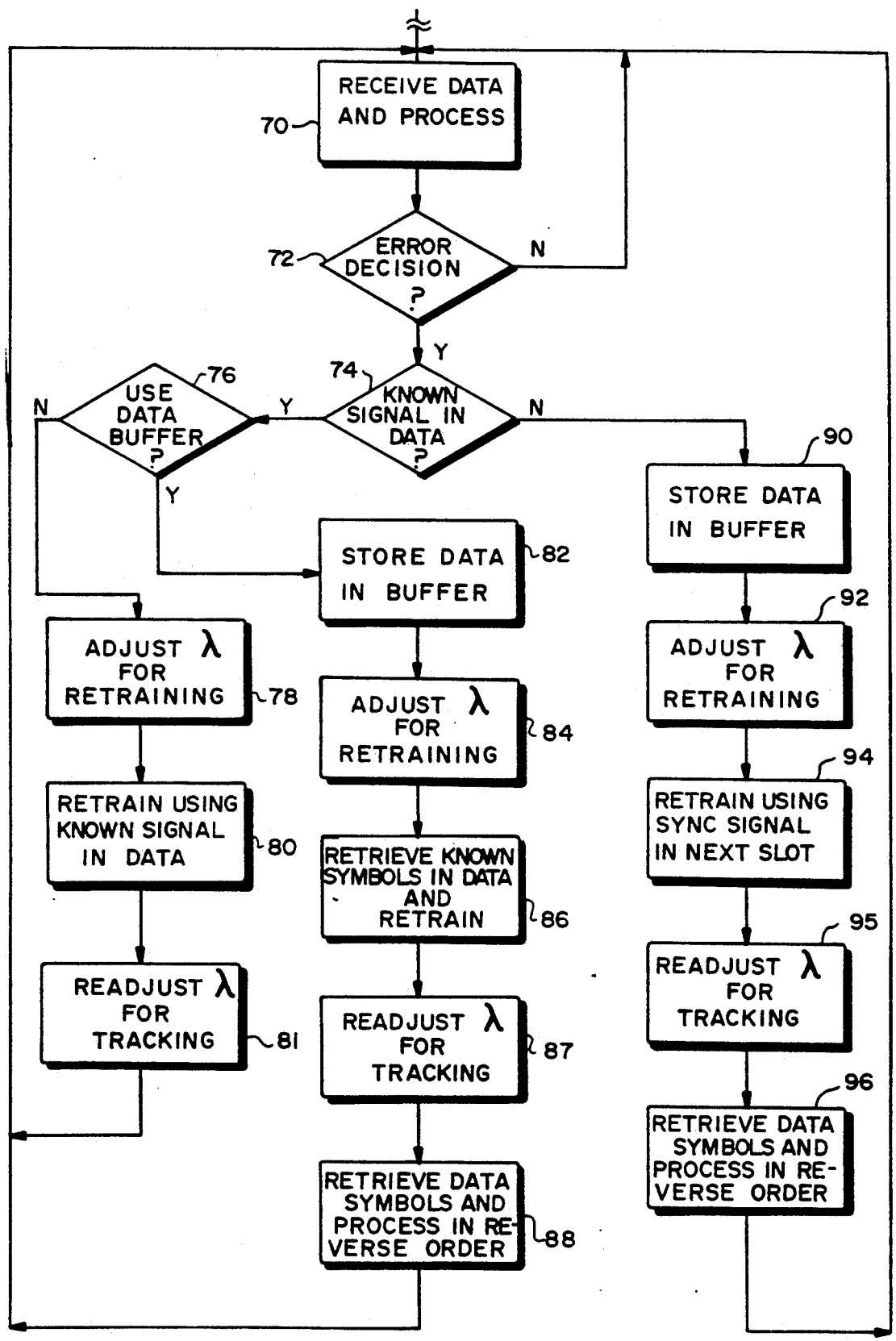
FIG. 6B is a flowchart diagram of several methods of recovering from the error condition shown in FIG. 6A in accordance with preferred embodiment of the present invention.

Referring now to FIGS. 2, 6A and 6B, and using the same assumptions as above, two alternative methods of retraining/recovery will be described. At step 70, the equalizer 34 is receiving and processing data transmitted during slot 1. Again, a deep fade occurs, which is reflected in the error decision signal e(n) at step 72. The process controller 40 then makes a determination at step 74 whether the remaining data in slot 1 contains symbols which are sufficiently invariable (i.e., known with sufficient certainty) to be used as a retraining signal. If no such symbols are available within the data of slot 1, then process controller 40 advances in succession through steps 90, 92, 94, 95 and 96 to retrain and recover as described above in connection with FIGS. 5A and 5B.

Alternately, if the process controller 40 does determine at step 74 that a suitable retraining signal is available within the data of slot 1, then the controller must decide whether to employ the data buffer 36 (step 76) in the retraining and recovery process. It should be understood that the choice of whether to employ the data buffer is generally influenced by the requirements of a particular application including the amount of time available for recovery, the desired bit error rate, etc. If the decision is not to use the data buffer, then the process controller 40 simply proceeds to step 78 where, as previously described, an appropriate $\lambda$ value is selected and retraining is effected (at step 80) using the known signal present in the data. The $\lambda$ value is then readjusted for tracking (at step 81) and the equalizer resumes receiving and processing data.

However, if the data buffer 36 is employed, the process controller 40 proceeds successively through steps 82, 84, 86, 87 and 88.

By using a known portion of the data signal for retraining (when available), the equalizer 34 is able to recover and process data in slot 1, following the occurrence of an error condition, without having to wait for the arrival of the SYNC 2 signal to retrain. Again, the ability of the present invention to dynamically optimize the convergence rate for retraining and tracking under prevailing conditions provides substantial improvement in performance.

Figure 7:
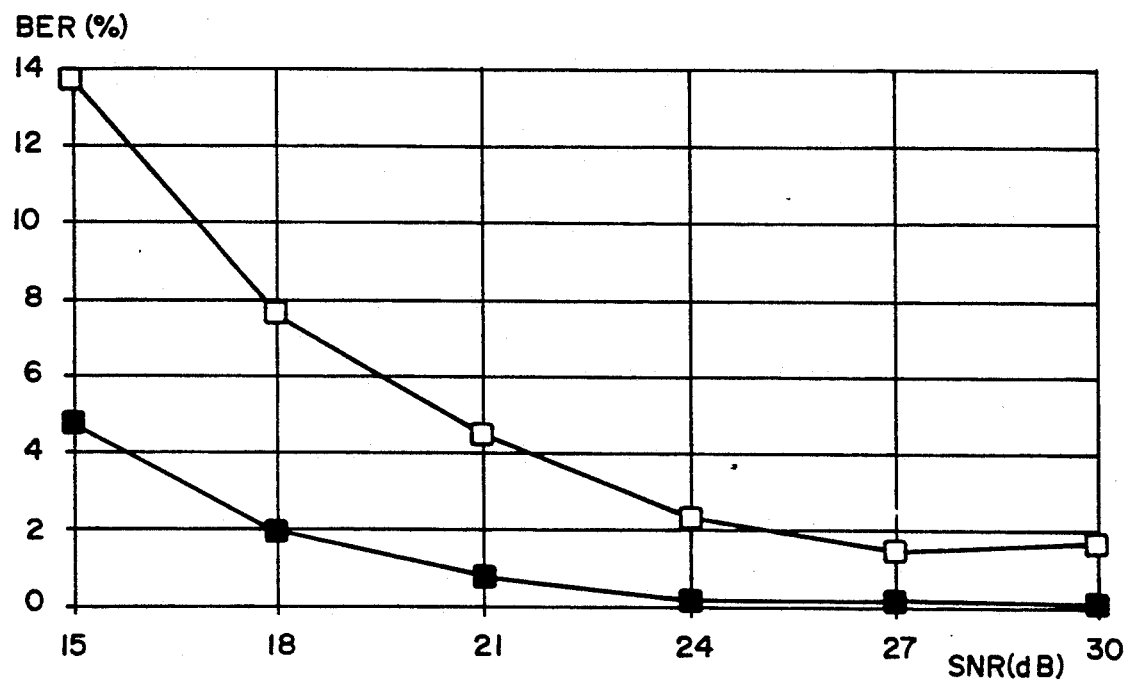
FIG. 7 is graph showing computer simulation results of the reduction in bit error rate percentage provided by a preferred embodiment of the present invention.

FIG. 7 is a graph showing the results of a computer simulation comparing the performance of the conventional decision feedback equalizer shown in FIG. 1 with that of the present invention. In this simulation, a two ray channel model with 40 μs separation, a vehicle speed (S(t)) of 100 km/h and the RLS algorithm were used. The white squares denote data points for the conventional equalizer while the black squares denote points for an equalizer constructed in accordance with the present invention. The vertical axis is the simulated bit error rate (BER) as a percentage of bits received and the horizontal axis is the signal-to-noise ratio (SNR) in decibels. As indicated, the present invention provides a bit error rate which is less than half that of a conventional equalizer over a wide dynamic range.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An adaptive equalizer for compensating a digital signal for dynamic variations in the transfer function of a communication channel, said digital signal being transmitted via the communication channel to said equalizer, said equalizer comprising:

(A) first and second adaptive tapped delay lines each having an input and an output, the input of the first adaptive delay line for receiving the digital signal from the communication channel, the input of the second adaptive delay line for alternately receiving either a training signal or a decision result signal, the output of each adaptive delay line for producing an output signal which represents the product of the signal received at the respective input, delayed by a predetermined period which is a multiple a symbol period or of a fraction of the symbol period, multiplied by a preselected coefficient;

(B) a first summer for adding the output signals from the first and second delay lines to produce a compensated digital signal;

(C) decision means for receiving the compensated digital signal and responsively producing a decision result signal which represents an approximation of the digital signal transmitted by the transmitter;

(D) a switch for alternately passing either the decision result signal or the training signal to an output node in response to a switch control signal;

(E) a second summer for producing an error signal which represents the difference between the compensated digital signal and the signal present at the output node;

(F) coefficient adjustment means for receiving the error signal and a convergence control signal and responsively adjusting the coefficients of said first and second adaptive delay line means;

(G) an error detector for receiving the error signal and responsively producing an error decision signal which is indicative of whether the equalizer is accurately tracking changes in the communication channel's characteristics; and (H) a controller for receiving the error decision signal and responsively producing said switch control signal, whereby during a data receiving mode of operation the switch passes the decision result signal to the output node and during training or retraining modes of operation the switch passes the training or retraining signal, respectively, to the output node.

2. The equalizer as in claim 1 wherein the controller means includes means for storing a plurality of values representing a range of convergence speeds, and selector means coupled to receive a signal indicative of the rate of change of the communication channel's characteristics and a parameter control signal and responsively select one of said plurality of values for the convergence control signal.

3. The equalizer as in claim 2 wherein a signal indicative of the speed of a moving vehicle in which the equalizer is disposed is used as the signal indicative of the rate of change of the communication channel's characteristics.

4. The equalizer as in claim 1 wherein the controller dynamically varies the convergence control signal to establish a different convergence rate during the receiving mode of operation and during the training or retraining modes of operation.

5. The equalizer as in claim 1 wherein the controller dynamically varies the convergence control signal to establish a different convergence rate during any of the training, receiving and retraining modes of operation.

6. The equalizer as in claim 5 wherein the controller responsively establishes a faster or slower rate of convergence depending upon the digital signal's duration.

7. The equalizer as in claim 5 wherein the controller is connected to receive a signal indicative of the rate of change of the communication channel's characteristics and dynamically adjusts the convergence control signal in response to said rate of change signal, the digital signal's duration and the mode of operation.

8. The equalizer as in claim 1 further comprising a memory coupled to the controller for temporarily storing the digital signal received form the communication channel and passing the stored digital signal to the input of the first adaptive delay line means in response to a memory control signal produced by the controller.

9. The equalizer as in claim 8 wherein the equalizer is used in a time division multiple access communication system and an error is detected during the data receiving mode of operation, and following the detection of said error said controller stores said received digital signal and a synchronization signal present in said received digital signal in the memory, retrains the equalizer using the stored synchronization signal in the retraining mode of operation, and passes the stored digital signal to the first adaptive tapped delay line in the reverse order from which the digital signal was received using the data receiving mode of operation.

10. The equalizer as in claim 8 wherein the equalizer is used in a time division multiple access communication system and an error is detected during the data receiving mode of operation, and following the detection of said error said controller stores said digital signal in the memory, restrains the equalizer using a predetermined portion of the stored digital signal in the retraining mode of operation, and passes the remainder of the stored digital signal to the first adaptive tapped delay line in the reverse order from which the digital signal was received using the data receiving mode of operation.

11. The equalizer as in claim 1 wherein the equalizer is used in a time division multiple access communication system and an error is detected during the data receiving mode of operation, and following the detection of said error said controller retrains the equalizer using a predetermined portion of the digital signal in the retraining mode of operation, after which the retrained equalizer resumes the data receiving mode of operation.

12. The equalizer as in claim 8 wherein the equalizer is sued in a time division multiple access communication system and an error is detected during the data receiving mode of operation, and following the detection of said error said controller elects whether to store the digital signal in the memory, retrains the equalizer using either a predetermined portion of the stored digital signal or a synchronization signal present in said received digital signal and the retaining mode of operation, passes the remainder of any stored digital signal to the first adaptive tapped delay line in the reverse order from which the digital signal was received using the data receiving mode of operation, and resumes the data receiving mode of operation.

13. The equalizer as in claim 1 wherein the error detector includes means for producing an output signal representing the square of the magnitude of the error signal, accumulator means for producing an output signal representing the sum of the squared magnitudes of K (K>1) previous error signals, delay means for transmitting the output signal of the squaring means to a third summing means after a delay of a predetermined period, said third summing means for producing an output signal which is the difference between the delayed output signal of the squaring means and the output signal of the accumulator means, and comparison means for comparing the output signal from the third summing means to a reference and responsively producing the error decision signal.

14. In an adaptive equalizer which receives a digital data signal from a communication channel, a method of recovering from an error condition comparing the steps of:
  using a training signal to cause said equalizer to converge;
  commencing a data receiving mode of operation in which said digital data signal is received from said channel and tracked by said equalizer;
  detecting that an error condition exists in said equalizer while said data signal is being received;
  following detection of the error condition, storing the data signal received from said channel in a memory;
  retraining the equalizer using a retraining signal received from the communication channel; and
  retrieving the stored data signal from the memory for tracking by the retrained equalizer.

15. The method as in claim 14 wherein following the step of stirring the received data signal, dynamically adjusting the equalizer for an optimal rate of convergence for retraining or an optimal rate of convergence for tracking the stored data signal.

16. The method as in claim 15 wherein the optimal rate of convergence is selected in response to a signal which is indicative of the rate of change of the channel's characteristics.

17. The method as in claim 16 wherein a signal indicative of the speed of a moving vehicle in which the equalizer is disposed is used as the signal indicative of the rate of change of the channel's characteristics.

18. In an adaptive equalizer which receives a digital data signal from a communication channel, a method of receiving from an error condition comprising the steps of:
  using a training signal to cause said equalizer to converge;
  commencing a data receiving mode of operation in which said digital data signal is received from said channel and tracked by said equalizer;
  detecting that an error condition exists in said equalizer while said data signal is being received;
  determining whether a portion of the received data signal is sufficiently invariable to be used as a retraining signal; and
  retraining the equalizer using either a sufficiently invariable portion of the received data signal or a retraining signal received from the communication channel.

19. The method as in claim 18 wherein when it is determined that a portion of the received data signal is not available for use as a retraining signal, the received data signal is stored in a memory, the equalizer is retrained using a retraining signal received from the communication channel, and the stored data signal is retrieved from the memory for tracking by the retrained equalizer.

20. The method as in claim 18 wherein when it is determined that a portion of the received data signal is available for use as a retraining signal, the received data signal is stored in a memory, the equalizer is retrained using said portion of the stored data signal, and the remainder of the data signal is retrieved from the memory for tracking by the retrained equalizer.

21. The method as in claim 18 wherein when it is determined that a portion of the received data signal is available for use as a retraining signal, the equalizer is retrained using said portion of the data signal, and the retrained equalizer resumes tracking the received data signal.

22. The method as in claim 18 including the step of dynamically adjusting the equalizer for an optimal rate of convergence for retraining or for tracking the stored data signal.

23. The method as in claim 22 wherein the optimal rate of convergence is selected in response to a signal which is indicative of the rate of change of the channel's characteristics.

24. The method as in claim 23 wherein a signal indicative of the speed of a moving vehicle in which the equalizer is disposed is used as the signal indicative of the rate of change of the channel's characteristics.

25. In an adaptive equalizer which receives a digital signal from a communication channel, a method of receiving from an error condition comprising the steps of:

using a training signal to cause said equalizer to converge;

commencing a data receiving mode of operation in which said digital data signal is received from said channel and tracked by said equalizer;

detecting that an error condition exists in said equalizer while said data signal is being received;

determining that a portion of the data signal is sufficiently invariable to be used as a retraining signal; and retraining the equalizer using said portion of the data signal.

26. The method as in claim 25 wherein the received data signal is stored in a memory, the equalizer is retrained using said portion of the data signal, and the stored data signal is retrieved from the memory for tracking by the retrained equalizer.

27. The method as in claim 25 wherein the retrained equalizer resumes tracking of the received data signal.

28. The method as in claim 25 including the step of dynamically adjusting the equalizer for an optimal rate of convergence for retraining or for tracking the stored data signal.

29. The method as in claim 27 wherein the optimal rate of convergence is selected in response to a signal which is indicative of the rate of change of the channel's characteristics.

30. The method as in claim 29 wherein a signal indicative of the speed of a moving vehicle in which the equalizer is disposed is used as the signal indicative of the rate of change of the channel's characteristics.

* * * * *